(12) United States Patent
Van Wageningen et al.

(10) Patent No.: US 8,687,520 B2
(45) Date of Patent: Apr. 1, 2014

(54) CLUSTER COUPLER UNIT AND METHOD FOR SYNCHRONIZING A PLURALITY OF CLUSTERS IN A TIME-TRIGGERED NETWORK

(75) Inventors: Andries Van Wageningen, Wijlre (NL); Joern Ungermann, Aachen (DE); Markus Baumeister, Aachen (DE); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 978 days.

(21) Appl. No.: 12/440,433

(22) PCT Filed: Aug. 28, 2007

(86) PCT No.: PCT/IB2007/053446
§ 371 (c)(1),
(2), (4) Date: Oct. 29, 2009

(87) PCT Pub. No.: WO2008/029322
PCT Pub. Date: Mar. 13, 2008

(65) Prior Publication Data
US 2010/0067404 A1 Mar. 18, 2010

(30) Foreign Application Priority Data
Sep. 6, 2006 (EP) .................................... 06120212

(51) Int. Cl.
*H04L 12/28* (2006.01)
(52) U.S. Cl.
USPC ...... 370/254; 370/503; 370/395.62; 709/223; 709/248
(58) Field of Classification Search
None
See application file for complete search history.

(56) References Cited

U.S. PATENT DOCUMENTS

2009/0122812 A1* 5/2009 Steiner et al. ................. 370/503

FOREIGN PATENT DOCUMENTS

| EP | 1569417 A1 | 8/2005 |
|---|---|---|
| WO | 2004105326 A | 12/2004 |
| WO | WO 2004/105326 A2 * | 12/2004 |
| WO | 2006024982 A1 | 3/2006 |

OTHER PUBLICATIONS

Hermann Kopetz et al., "The Time Triggered Architecture", Proceedings of the IEEE, IEEE, vol. 91, No. 1, Jan. 2003, pp. 112-126.*
Hermann Kopetz et al., "A Synchronization Strategy for a Time-Triggered Multicluster Real-Time System", IEEE, Sep. 1995, pp. 154-161.*

(Continued)

*Primary Examiner* — Nicholas Sloms (57) ABSTRACT

The invention relates to a time triggered network used in particular in an automotive network having a plurality of clusters. Each cluster (A-X) includes a plurality of nodes (11). For saving time during startup a cluster coupler unit (10) in a time triggered network is proposed, wherein the network comprises a plurality of communication clusters (A-X) each having a plurality of nodes (11), the communication clusters (A-X) are compatible to each another in cycle length, slot length and frame length, wherein a cluster coupler unit (10) being connected to at least two communication clusters (A-X), the cluster coupler unit (10) includes as many protocol engines (12) as communication clusters are connected, each protocol engine (12) having at least one receiving input (RXD) and one transmitting output (TXD), wherein a synchronization logic (20) is connected to at least one of the receiving inputs (RXD) and/or the transmitting outputs (TXD) of the protocol engines (12), wherein the synchronization logic (20) distributes information from incoming/outgoing signals, which is used for synchronizing the connected communication clusters (A-X) during startup.

17 Claims, 8 Drawing Sheets

(56) References Cited

OTHER PUBLICATIONS

Kopetz, Hermann, et al; "The Time-Triggered Architecture"; Proceeding of the IEEE, IEEE, New York, US; vol. 91, No. 1; Jan. 2003; XP011065101; ISSN: 0018-9219.

Kopetz, Hermann, et al; "A Synchronization Strategy for Time-Triggered Multicluster Real-Time System"; Reliable Distributed Systems; Bad Neuenar; IEEE, US, Sep. 13, 1995; p. 154-161; XP002293492.

* cited by examiner

CLUSTER COUPLER UNIT AND METHOD FOR SYNCHRONIZING A PLURALITY OF CLUSTERS IN A TIME-TRIGGERED NETWORK

The invention relates to a cluster coupler unit in a time triggered network, wherein the network comprises a plurality of communication clusters each having a plurality of nodes. Further it relates to a time triggered network and to a method for synchronizing a plurality of clusters in a time-triggered network.

Modern communication network systems generally do not consist of a single communication domain. Instead, multiple such communication domains are connected possibly each using a different communication protocol.

Current automotive networks generally consist of multiple CAN (car automotive network) and LIN (local interconnected network) clusters interconnected by gateway nodes or cluster coupler units. These protocols are not prepared for exchanging safety-relevant information in real time. Since the demand for safety-relevant functions realized within automobiles increases, the need to connect safety-relevant nodes with a network is further increased. Therefore safety-relevant protocols need to be integrated into such networks. Especially, multiple safety-relevant communication clusters have to be interconnected.

When multiple communications cluster are used in the same environment, e.g. car, without further coordination each communications cluster has its own timing, meaning that each cycle length is different and that the cycle starts are not synchronized. Even, when the communications cluster are configured identical, due to the nature of the distributed startup and the cluster internal clock synchronization or due to oscillator inaccuracies, these parameters will drift apart resulting in unsynchronized clusters. However, the transmission of safety-relevant in real time requires tightly synchronized clusters.

Communication units or conventional cluster couplers are used to connect such different communication clusters. Such conventional cluster couplers that have access to all such communication clusters can naturally distribute information that would align or synchronize the communication clusters, but these mechanisms work slowly as not to disturb the ongoing communications. Therefore they are not well suited for the initial synchronization, but more for keeping multiple communication clusters synchronized, lest their clock synchronization mechanism rip them apart. Especially if the time required for the initial synchronization would result in a user noticeable delay in the application function, acceptance for such a system will be low.

The problem therefore consists of preventing large differences in both rate and offset of the multiple communication clusters already during the startup. Then, from the beginning the communication clusters can intercommunicate and all applications depending on this communication can be started. Other, conventional, mechanisms can then prevent the communication cluster synchronization from deteriorating.

However, startup works normally in a way that the maximum execution time is bounded but not deterministic. Noise on a specific channel or interaction with other nodes on this communication cluster may delay or speed up the startup of a specific communication cluster compared to the others.

The trivial solution is to start one communication cluster first and then let a node connected to this first communication cluster initialize the communication schedule for the others communication cluster, thereby imposing the timing of the first communication cluster upon the others communication cluster. This has the severe disadvantage that the second and following communication clusters can only start after the first communication cluster has established communication, thereby at least doubling the minimum time required before all communication clusters can communicate.

Gateways, switches or conventional cluster couplers connecting time-triggered communication clusters, aiming at low latency and operation without, or limited buffer-space, require synchronization of the individual clusters. Protocols like the time-triggered FlexRay provide means to apply external clock corrections to achieve synchronization of initially nonsynchronized clusters. But this approach is prohibitive, since it consumes too much time to be practical in typical configurations and for typical applications. Therefore the communication clusters must be started synchronized.

However, startup depends on stimuli perceived on the local medium. So even if all clusters are started at the same time, they will generally not start synchronized.

It is therefore an object of the present invention to provide a cluster coupler unit and a method for synchronizing communication clusters, which are capable of synchronizing the connected communication clusters during startup in minimum of time.

The object is solved by the features of the independent claims.

The invention is based on the thought, to extract information useful for startup synchronization from the initial traffic on the channels of the time triggered network. The extraction of information relevant for startup synchronization is performed for a predetermined time and/or controlled by an application host. Since only the information relevant for synchronization during startup is extracted the synchronization logic is very simple. After startup of the nodes the synchronization logic may be disabled or may alternatively be used for maintaining the synchronization between the nodes during operating the network.

Further advantageous implementations and embodiments of the invention are set forth in the respective sub claims.

This invention proposes a cluster coupler unit and a method for synchronizing the communication clusters during startup. It provides means for exchanging the relevant synchronization information between protocol engines within a cluster coupler unit.

For each cluster the cluster-coupler, which is a node connected to multiple clusters, contains one protocol engine. The protocol engines can be used for different purposes, e.g. to connect an application host, or a router to the different clusters. The protocol engines in the intelligent cluster coupler are connected via an additional synchronization logic circuit that is designed such that all relevant startup and synchronization information of the protocol engines in the cluster coupler is distributed on all clusters. While the protocol engines in the cluster coupler primarily synchronize to each other, the other conventional nodes in each cluster must integrate upon the transmitted information from the protocol engines in the cluster coupler. The conventional nodes are only responsible for message exchange, but not for startup or synchronization. Thus, all other nodes of all attached communication clusters are configured in a way that they either cannot initiate the startup at all or have a generous delay configured to give the central cluster coupler the opportunity to start up first. Further, all communication clusters must be configured alike so that the cycle length, slot length and frame length are compatible to each another.

A cluster coupler is generally also called a gateway node, but not restricted to this special application—it may just as well serve only for synchronizing the communication clusters without exchanging additional information between them.

The invention enables a central cluster coupler that is part of all communication clusters to easily synchronize the startup, without modifying the underlying protocol. Its implementation and verification is very simple, since the hardware configuration of the existing IP block of the protocol engines need not be changed. The inventive concept is very well suited for gateway nodes that naturally have access to multiple communication clusters and need them synchronized to minimize at the same time the propagation delay for inter-cluster communication and the necessary message buffer memory. Additionally, this invention also solves the problem of keeping multiple communication clusters synchronized after being started, if the communication clusters are configured correctly.

According to a first embodiment of the invention a hierarchical synchronization arrangement is proposed, wherein the protocol engines of a cluster coupler synchronize to each other and impose their timing on the individual clusters from the start.

According to a second embodiment of the invention a common-mode reception for protocol engines attached to different clusters in a cluster coupler to enforce perfect startup synchronization is proposed.

According to a third embodiment of the invention it is proposed to single out a specific attached communication cluster as master and to enforce its timing on the other clusters.

In a situation, where multiple communication clusters need to be synchronized, there is most often a single or multiple redundant components gateways or cluster couplers that have access to all communication clusters. By using this invention it is possible to enable a synchronous startup of all attached communication clusters by using a two-level procedure wherein primarily the cluster masters synchronize and secondarily impose their synchronization onto the individual clusters.

The invention is described in detail below with reference to the accompanying schematic drawings, wherein.

Figure 1:
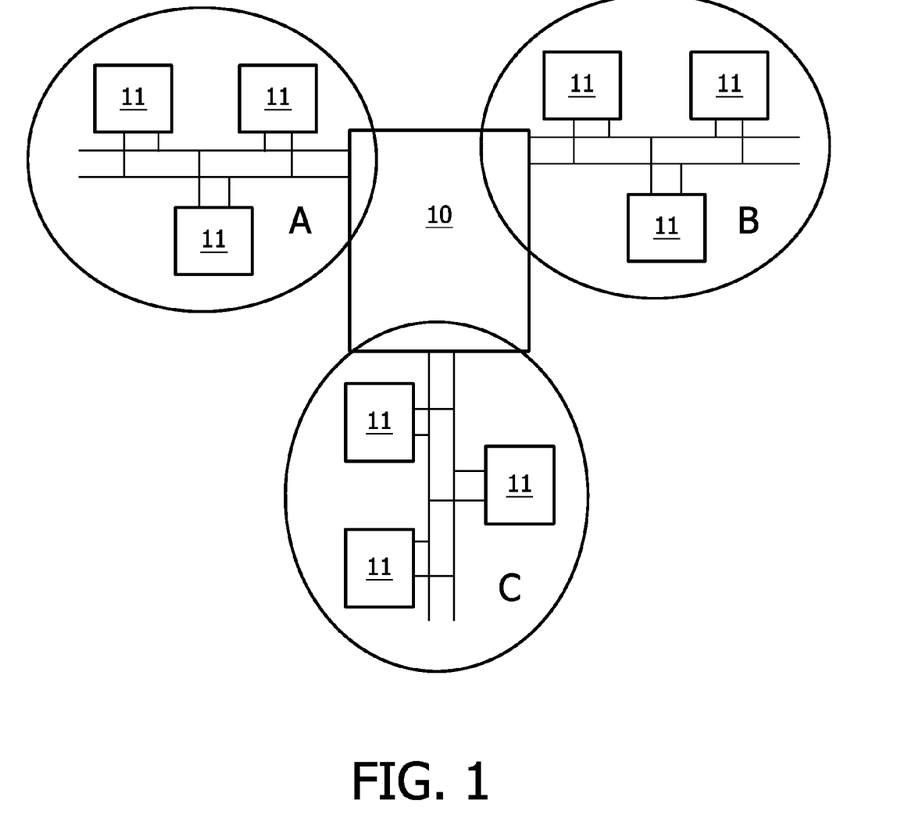
FIG. 1 shows a network having a plurality of communication clusters.
Figure 2:
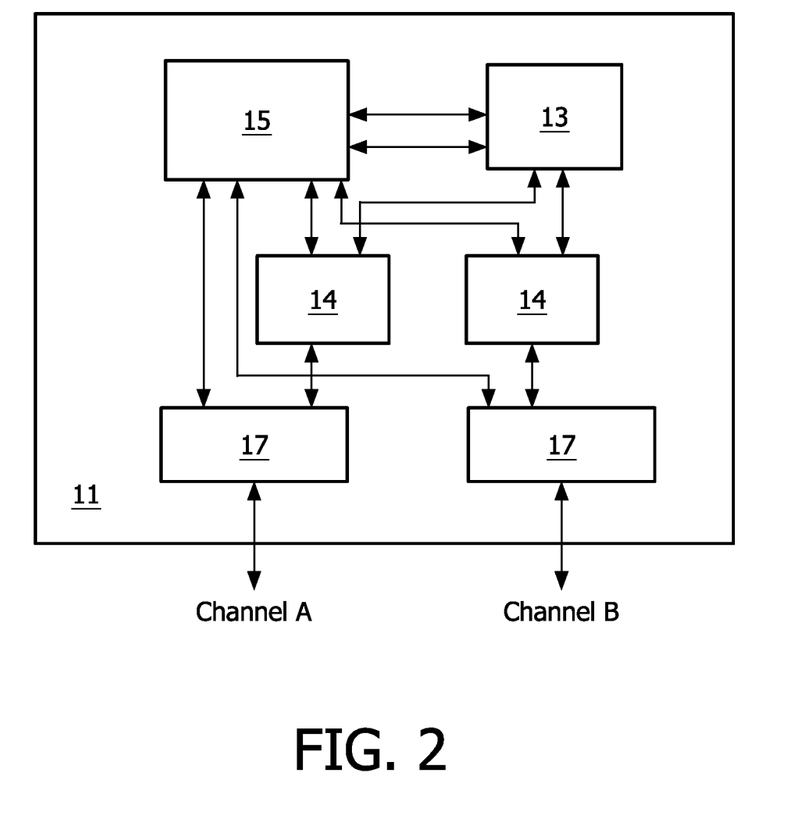
FIG. 2 shows a block diagram of a node according to the invention.

A typical fault-tolerant time-triggered network, as illustrated in FIG. 1, consists of two or more communication channels Channel A, Channel B, to which nodes 11 are connected. FIG. 2 illustrates a node 11 as used in the time-triggered network. Each of those nodes 11 comprises bus drivers 17, a communication controller 15, eventually a bus guardian device 14 for each bus driver 17 and the application host 13. The bus driver 17 transmits the bits and bytes that the communication controller 15 provides onto its connected channel and in turn provides the communication controller 15 with the information it receives on the channel. The communication controller 15 is connected to both channels and delivers relevant data to the host application 13 and receives data from it that it in turn assembles to frames and delivers to the bus driver 17. The communication controller 15 is mainly composed of a protocol engine 12 and a controller host interface (not illustrated). The controller host interface is responsible for buffer management and data transfer between the host application 13 and the communication controller 15. The protocol engine 12 is realized in hardware.

For this invention, only the communication controller 15 within the cluster coupler 10 is of importance. The bus driver 17, the bus guardian 14 and the host devices 13 are only listed to provide a better overview, in which context the invention might be used. The invention is not limited or restricted by the presence or absence of those devices. Those networks systems are at least partially time-triggered, meaning that the time is sliced into recurring cycles, where each cycle consists of several segments. Each node 11 determines the start of a new cycle according to its own built-in clock. At least one segment is divided into a fixed number of time slots, where each time slot is assigned up to at most one communication controller 15 of the nodes 11, wherein that communication controller 15 and alone that communication controller 15 has the right to transmit. Other segments of the cycle can be used for dynamic arbitration schemes or other purposes.

The bus guardian 14 is a device with an independent set of configuration data that enables the transmission on the bus only during those slots, which are specified by the configuration set.

The application host 13 contains the data source and sink and is generally not concerned with the protocol activity. Only decisions that the communication controller 15 cannot do alone are made by the application host 13.

A single node 11, called cold-starting node 11, initiates a communication schedule. According to the invention this cold starting node is the cluster coupler 10. This cluster coupler 10 is selected either by configuration or by some algorithm, that determines which of several potential nodes/cluster couplers performs the startup. This algorithm generally consists of transmitting frames or similar constructs over the attached channels, whenever no existing communication schedule could be detected.

The communication controller 15 of the (potential) cold-starting node 11, thereby has to listen to all attached channels and has to transmit its startup data on all attached (potentially redundant) channels at the same time. Each node 11 within the clusters listens to its attached channels. If it receives specific frames or similar constructs indicating a startup it will adopt the timing scheme from the observed communication and integrate into the network.

Two systems that match this description are the TTP (time triggered protocol) specification and the FlexRay protocol.

Figure 3:
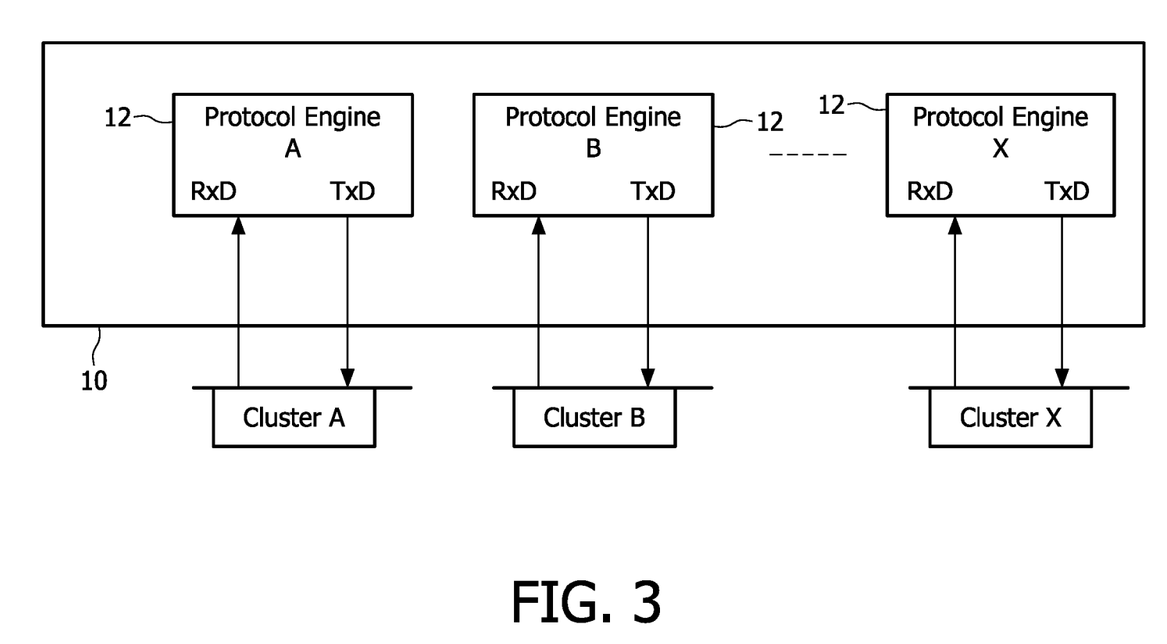
FIG. 3 shows a block diagram of a conventional cluster coupler unit.

FIG. 3 illustrates a conventional cluster coupler or conventional gateway, which is connected to a plurality of clusters A-X. No means for synchronization during startup period are included. Thus, the start synchronization is performed in conventional way on application level consuming a lot of times.

Figure 4:
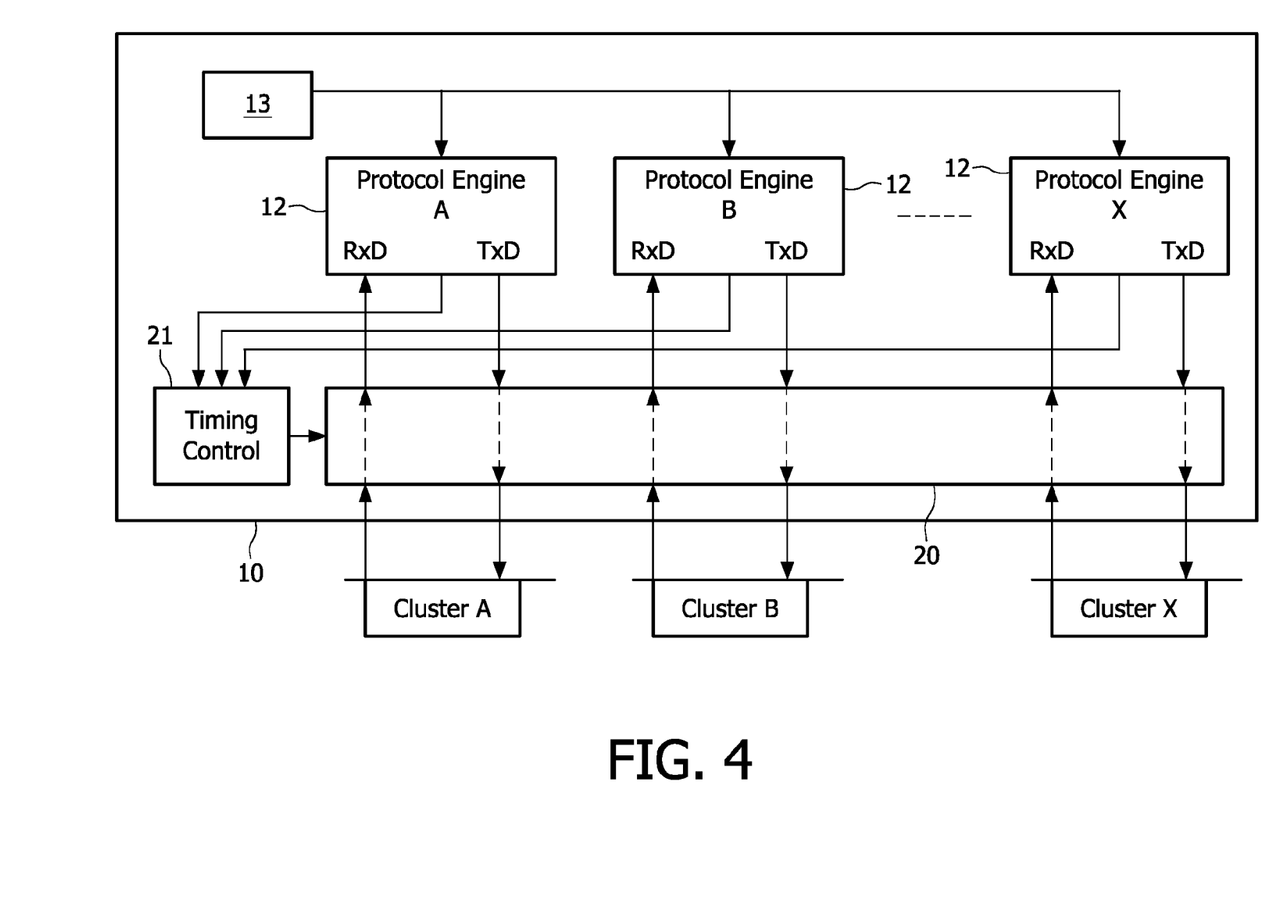
FIG. 4 shows a block diagram of a cluster coupler unit according to the invention.

FIG. 4 represents a cluster coupler 10 according to the invention. There are as many protocol engines 12 as clusters A-X are connected to the cluster coupler 10. In general, the cluster coupler 10 includes three communication controllers realized as protocol engines each, further they may include a controller host interface if required. Further, an application host 13 is depicted providing a stimulus for starting the startup synchronization. After receiving a stimulus at least one of the protocol engines starts to transmit a frame indicating startup into its connected cluster A-X. However, it is also possible to wait a predetermined time, e.g. for executing a start up algorithm. After transmitting the frame indicating startup into its connected cluster A-X this frame is distributed by the synchronization logic 20 to the other clusters. Due to the loop back function the startup/synchronization frame is received in the RxD pin of the other protocol engines too. The loop back function is transferring the outgoing data back to the RxD pin of sending output and additionally to the bus of the cluster. The synchronization logic 20 is receiving the startup/synchronization frame or other information indicating the startup procedure. It will distribute this information to the other protocol engines 12 for starting the clusters A-X simultaneously. After synchronizing the clusters the synchronization logic 20 may be disabled by a timing control 21. A further possibility is to activate the synchronization logic 20 at predetermined moments to monitor and maintain the synchronization between the clusters during operating.

Figure 5:
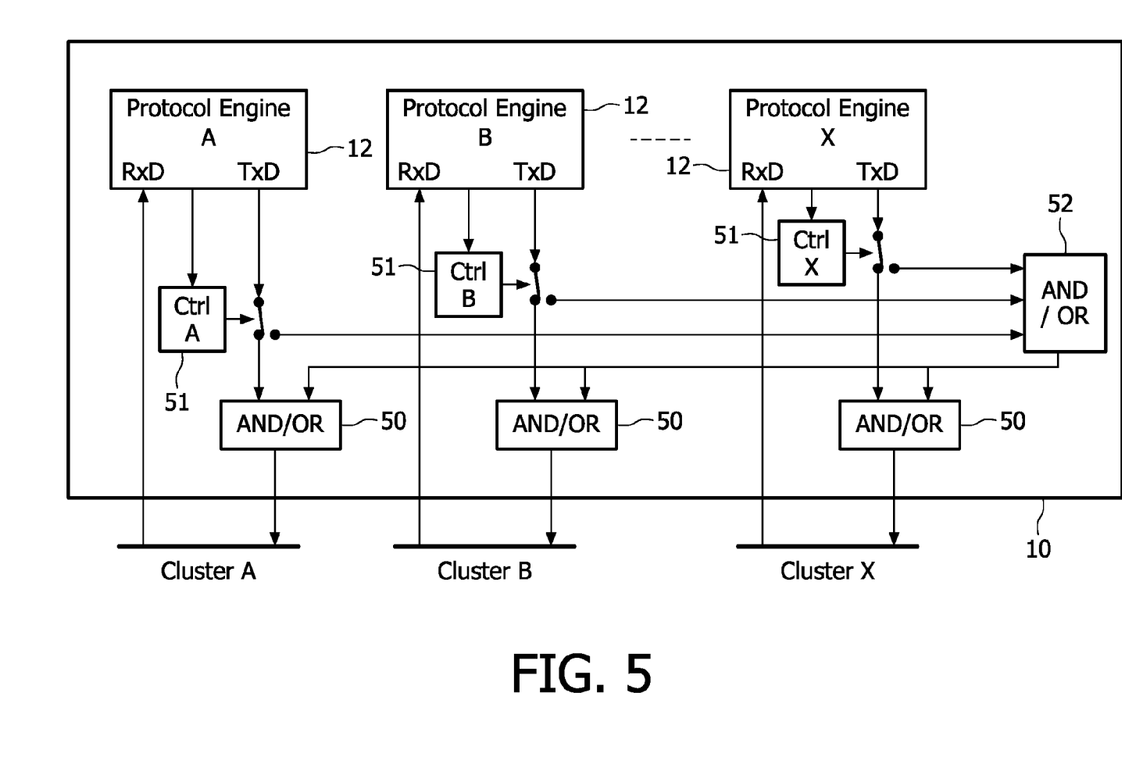
FIG. 5 shows a cluster coupler unit according to a first embodiment of present the invention.
Figure 6:
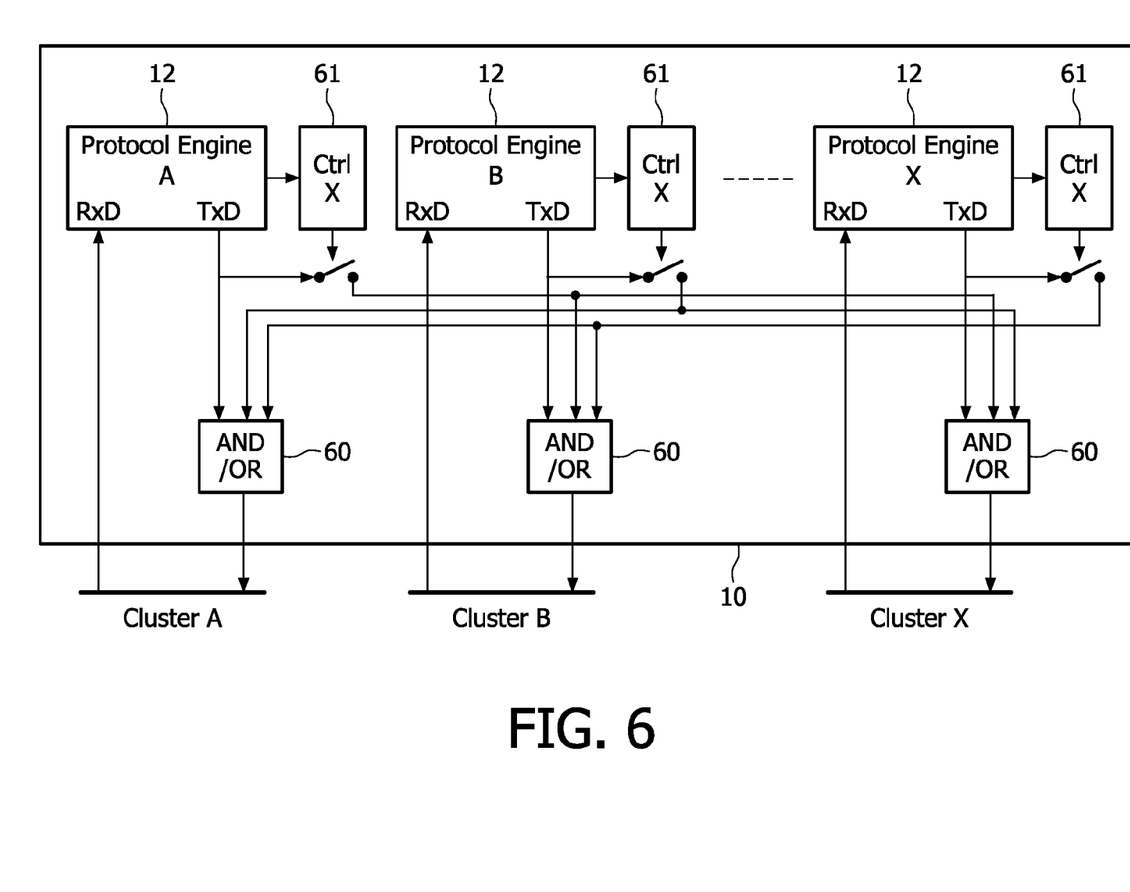
FIG. 6 shows an alternative cluster coupler unit according to a first embodiment of present the invention.

Referring to FIGS. 5, 6 a cluster coupler 10 according to the first embodiment is illustrated. It is connected to several communication clusters A, B, X each served by a standard protocol engine 12, which is realized as a hardware IP block. The protocol engine 12 contains the normal protocol knowledge about startup, communication schedule, media access, etc. The protocol engine 12 has multiple inputs and outputs of which only two are depicted. The RxD pin represents the receive path while the TxD pin represents the transmit path of a channel. Generally, but not exclusively, both are serial interfaces toggling between a '0' and a '1' state. For the FlexRay protocol the transmit path has an additional 'enable' pin needed for attaching three-state physical layers, which will be handled analogous to the TxD signal (not illustrated). The synchronization logic circuits 50, 51, 52 enable the protocol engines 12 to synchronize to each other. It is assumed, that via the loop back function all transmissions on a channel are also received via the respective rxd pin. This enables each protocol engine 12 to also receive the startup related transmissions of the other protocol engines 12 which are combined in the synchronization logic circuits 50, 52 onto their channel. Should loop back not be possible, additional measures must be taken to feed the startup related transmissions of the protocol engines 12 also directly to the rxd inputs.

In FIGS. 5, 6 only a single attached channel per protocol engine 12 is depicted. Nevertheless, the invention is not restricted to such single-channel systems. Multiple channels can easily be supported. If each protocol engine is connected to the same number of channels, these can be numbered from 1 to x. The logical combining in the synchronization circuits is now done separately for each set of channels with the same index.

Depending on the protocol used and the physical layer, especially its representation of the idle state, an appropriate 'ANDing' may be used. The FlexRay protocol is based on a low(0)-dominant logic. Thus, this would be the common definition of 'ANDing' meaning that multiple deviating inputs are combined in a low(0)-dominant way.

In high(1) dominant logic protocols OR-circuits should be used to provide the output signals of one protocol engine 12 to the other transmitting paths of the other protocol engines 12 to distribute the startup frame into all clusters.

All protocol engines 12 of the cluster coupler 10 may receive the command to startup simultaneously, e.g. from an application host 13 within the cluster coupler 10 or from a higher protocol level device.

The startup and synchronization frame transmitted via the output of the protocol engine are combined together and fed into each of the clusters. Because they are sharing each other's startup and/or synchronization data via the channels, they will synchronize according to the "standard" startup procedure. The control circuits 51 are protocol dependent and responsible to filter the transmission information such that only startup and clock synchronization related information is distributed across the communication clusters and not any other frame or similar construct generated by the protocol engines 12 of the cluster coupler 10.

For the FlexRay protocol, this control circuit will distribute the initial CAS symbol sent in the 'coldstart collision resolution' state, and all startup frames, but no other frame. All communication clusters must naturally be configured in a way to prevent collisions with frames or similar constructs sent by the protocol engines of the coupler. For FlexRay, this would mean to keep the key slot within the startup frame of the couplers protocol engines unoccupied by the other conventional nodes of clusters.

If the cluster coupler 10 contains at least two protocol engines, other conventional nodes in the clusters are not needed for the startup procedure. It is even preferred that no other nodes than the cluster coupler 10 participate in the startup procedure, meaning that the whole communication network relies on the presence of the transmissions of the protocol engines 12 in the cluster coupler 10. This circumvents the problem of inconsistent startup attempts by conventional nodes 11 within the clusters and the interference to the startup attempt of the protocol engines in the coupler. It is also preferred that no other node than the cluster coupler is allowed to transmit synchronization frames to avoid that different nodes would receive different sets of startup frames. This would complicate the proof of correct functioning of the startup algorithm.

To prevent a single failure of the cluster coupler, which would cause no startup of the communication clusters, it is preferred that multiple such couplers are present. The cluster couplers must share at least a channel in one of the clusters to be able to synchronize to each other. The cluster couplers preferably share multiple channels for those clusters containing multiple channels to provide redundant inter-cluster connection and redundant inter-cluster synchronization. In case of redundant cluster couplers the plurality of cluster couplers may or may not be connected to the same communication clusters. If additionally only frames or similar constructs sent by the 'startup masters' to all communication clusters via the described mechanism are used for clock synchronization, near-perfect synchronicity is enforced over all communication clusters during operation of the network.

For FlexRay, this would mean that no other nodes than the described cluster couplers are allowed to send synchronization frames. Because each cluster coupler could take the lead in the startup, only the protocol engines of a cluster coupler that share a channel with the protocol engines in the other cluster couplers should be allowed to take the lead in the startup procedure, because they are able to solve a coldstart collision between the different cluster couplers. As a result, all communications clusters will be aligned to at least one such cluster coupler. The intercommunication of all cluster couplers guarantees that all these cluster couplers agree with each another on the timing and all conventional nodes on the clusters agree on the timing of the coupler nodes. The only difference may stem from different topologies of the physical layer, which can be taken into account when defining a common assumed precision for all communication clusters.

FIGS. 5 and 6 represent different realizations for a cluster coupler 10 according to the first embodiment of the invention. As could be easily seen the circuitry in FIG. 5 is more complex than in FIG. 6. In FIG. 5, there is a further logic circuit 52 combining the inputs of the transmitting paths in case of being activated by the control circuits 51. Thus, when one of the protocol engines 12 transmits a startup/synchronization frame the control circuit 51 will provide this signal to the further logic circuit 52. Depending on the protocol the signals are combined in such way that in case of an input this input will be supplied to all other synchronization circuits 50 of the other protocol engines 12. Thus, the startup/synchronization frame is provided at the same start moment to all communication clusters.

In FIG. 6 the output TxD of each protocol engine 12 maybe enabled by the control logic 61 to fed startup/synchronization frames to all other transmit paths simultaneously. Other data are only provided to the transmit path of the own cluster.

Now, the second embodiment of the present invention will be described with reference to FIG. 7. In the second embodiment, all other nodes of all attached communication clusters need to be configured in a way that they either cannot initiate the communication startup at all or have a generous delay configured to give the central node (cluster coupler) the opportunity to start up first. Further, all communication clusters must be configured alike so that the cycle lengths are identical to one another. Thirdly, it is assumed that all attached communication clusters are in a pristine state, meaning that they do not communicate currently, but await startup. This is a valid assumption for system startup. Should the cluster coupler 10 have need of a restart while communication has already been engaged, it must normally integrate each of its protocol engines 12 and try to resynchronize the communication clusters later on using external clock correction.

All protocol engines 12 of the cluster coupler 10 may receive the command to startup simultaneously, e.g. by an application host 13 (not illustrated). All receiving inputs RxD of the protocol engines 12 are combined using the synchronization circuits 70, 72, so that all protocol engines 12 are subject to the same stimulus. Since the protocol engines 12 receive identical stimuli and may also implemented identically they will always come to the same conclusion whether and how to startup. Any stimulus on a single communication cluster that had normally only delayed or sped up the startup of this communication cluster influences now all protocol engines 12 of this cluster coupler 10 in the same way. Therefore, the protocol engines 12 will initiate communication at the same point in time and thereby guarantee that all communication clusters A-X start up perfectly synchronized.

Figure 7:
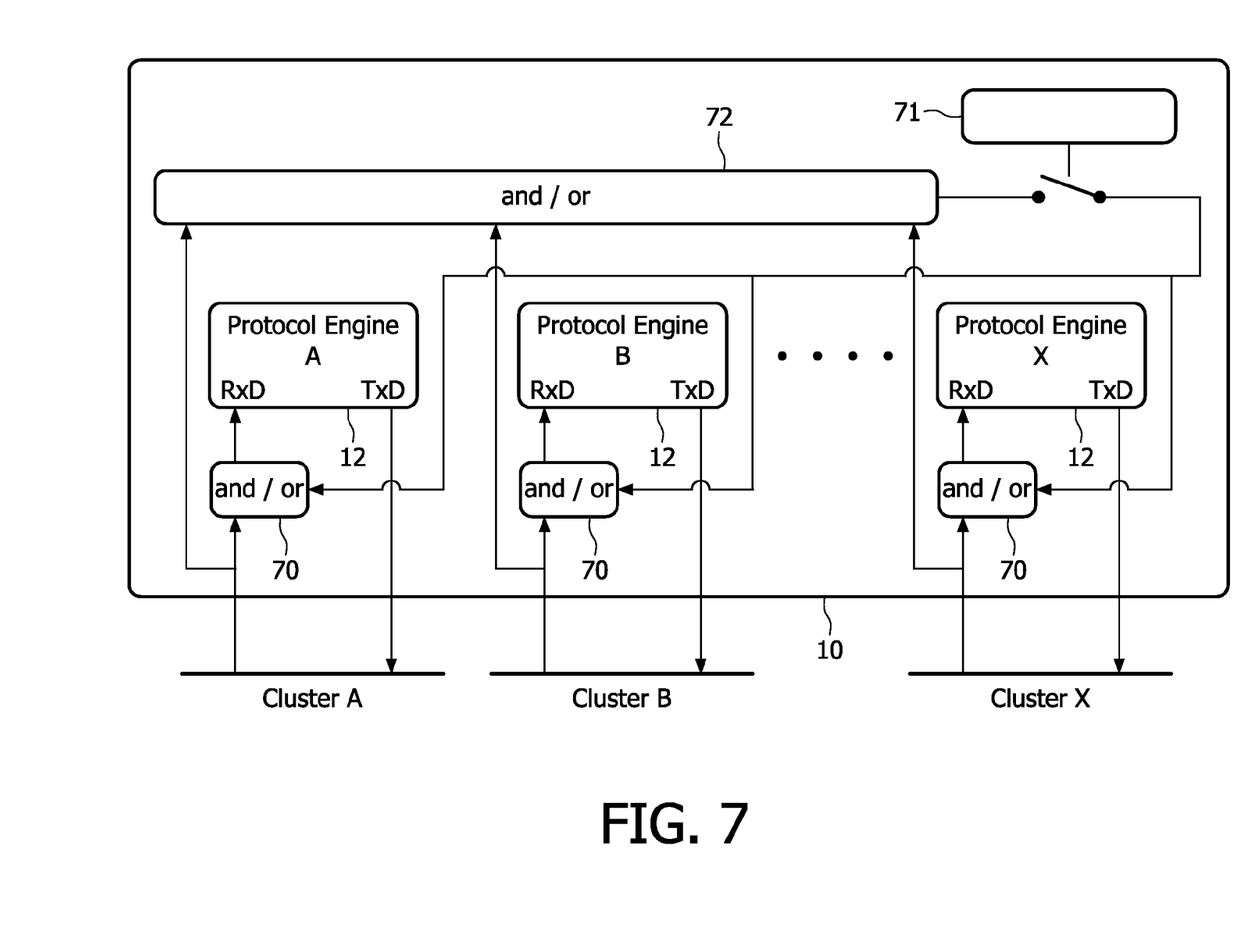
FIG. 7 shows a cluster coupler unit according to a second embodiment of present the invention.

FIG. 7 illustrates how the cluster coupler 10 is connected to several communication clusters A-X, each served by a standard protocol engine 12. The protocol engine 12 is constructed in the same way as the first embodiment.

The cluster coupler 10 according to the second embodiment includes synchronization logic circuits 70, 72 in the RxD input paths of all protocol engines 12, which serve to combine the inputs to them. A control logic 71 receives inputs (not illustrated) informing it about the startup state of the protocol engines. This input will most likely be served from a host application 13 or a host interface block (not depicted here), though it could also be directly extracted from the protocol engines 12.

In FIG. 7 only a single attached channel per protocol engine is depicted. Nevertheless, multiple channels are easily supported as explained above.

Depending on the protocol used and the physical layer, an appropriate 'ANDing' is used in case of low(0)-dominant logic. In case of high(1)-dominant logic OR circuits are used. For the FlexRay protocol this would be the common definition of 'ANDing' meaning that multiple deviating inputs are combined in a low-dominant way.

Depending on the startup algorithm of the protocols used, the combining of the RxD pins in the synchronization logic circuits 70, 72 is disabled at a convenient point in time by the control logic 71. Then the receiving data are provided only to the connected protocol engine.

Generally, just before the (first) protocol engines start transmission is a fitting point in time posing no troubles for any protocol. For the FlexRay protocol this may be the entry into the ' coldstart collision resolution' state. To even further increase the chance that all communication clusters A-X start up synchronously the moment of separating the clusters A-X may be even more delayed.

If additional logic (not illustrated) ensures that the transmissions of the protocol engines 12 of the cluster coupler are not combined into the common channel view (e.g. disable the RxD input of a specific protocol engine 12 into the combined view when the protocol engine in question transmits (easy to determine for FlexRay by monitoring the txen pin)), the combining (ANDing) may need to be stopped only upon entering the 'coldstart consistency check' state. In this case it is preferable that all protocol engines 12 of the cluster coupler are assigned the same key slot ID number to prevent inconsistencies during this phase. In case that a single communication cluster aborts startup later on, while the others succeed, this protocol engine must use the trivial approach by enforcing the general consensus upon it when it retries the startup later on. In case that a single or multiple communication clusters already communicate when the cluster coupler is (re-)started, it may be difficult to determine this, since the combined input of multiple clusters may not result in decidable communication elements. In case that the communication clusters were synchronized shortly before, they cannot have deviated much from one another. To handle this special case of reintegration well, one might assign a specific slot or segment uniquely to each communication cluster, so that communication within this slot is not disturbed when being combined with other cluster communication. This enables a fast reintegration of a gateway that initiated and synchronized the communication of the multiple attached communication clusters, but had to be reset/restarted for some reason.

Figure 8:
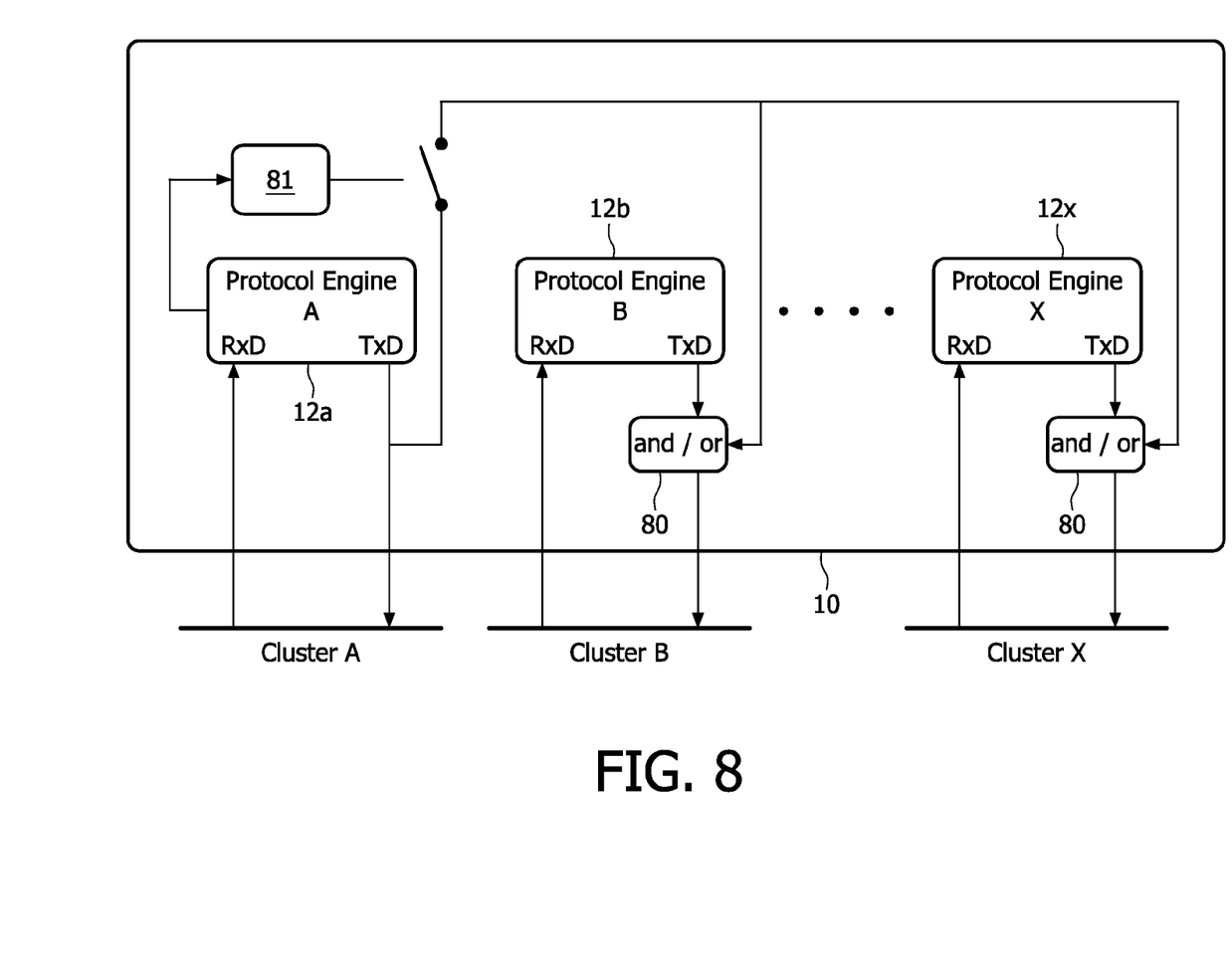
FIG. 8 shows a cluster coupler unit according to a third embodiment of present the invention.

Referring to FIG. 8, the third embodiment of the present invention is explained in more detail. One of the protocol engines 12a of the cluster coupler 10 is singled out and determined to be the master of the lot. All its startup and synchronization related information is distributed over all attached clusters, while the other protocol engines 12b, 12x must integrate upon this transmitted information and are only responsible for message exchange, but not for startup or synchronization. It is shown how the cluster coupler 10 is connected to several communication clusters A-X, each served by a standard protocol engine 12a, 12b, 12x. The protocol engines 12 of the third embodiment are constructed in the same way as the protocol engines of the first and second embodiment.

The cluster coupler 10 includes additionally a control logic 81 that essentially enables the protocol engine 12a to transmit simultaneous in all attached communication clusters. By use of the loop back function all transmissions on a channel are also received via the RxD pin. This enables protocol engines 12b, 12x assigned to the clusters B to X to also receive the transmissions of protocol engine 12a on their channel as they occur. The transmitting paths of the clusters B and X include a synchronization circuit 80 each, which both receive the transmit information from cluster A when the control circuit 81 has enabled the distribution of the startup/synchronization frames by closing the switch. Thus, depending on the protocol a supplied signal at the synchronization logic 80 is supplied to connected clusters B and X. Thus, the startup/synchronization information is provided to the other clusters B and X simultaneously. The control circuit 81 is protocol dependent and is responsible for only distributing startup and clock synchronization related information across the communication clusters and not every frame or similar construct transmitted by the protocol engine 12a labelled 'A' onto the 'master cluster'. For the FlexRay protocol this logic would distribute the initial CAS symbol sent in the 'coldstart collision resolution' state, and all startup frames, but no other frame.

In case that the protocol does not support the loop back function additional measures must be taken to feed the startup related transmissions of protocol engine 12a directly to the RxD inputs of protocol engines 12b, 12x.

As explained for the first embodiment in FIG. 8 only a single attached channel per protocol engine is depicted. Nevertheless, the invention is not restricted to such single-channel systems. Multiple channels are easily supported. If each protocol engine is connected to the same number of channels, these can be numbered from 1 to y. The combining in the synchronization circuits 80 is now done separately for each set of channels with the same index.

Depending on the protocol used and the physical layer, especially its representation of an idle channel, an appropriate 'ANDing' is used. For FlexRay this would be the common definition of 'ANDing' meaning that multiple deviating inputs are combined in a low(0)-dominant way. In high(1) dominant logic protocols OR-circuits are used to provide the output signals of the master protocol engine 12a to the other transmitting paths of the other protocol engines 12 to distribute the startup frame into all clusters.

By using the inventive circuitry in the cluster coupler 10 all protocol engines 12a-12x of the cluster coupler 10 are given the command to startup simultaneously. The protocol engine 12a labelled 'A' can be seen as a 'startup master' that controls the startup of all attached communication clusters B and X. Therefore, one can see also communication cluster 'A' as a 'master cluster' and the remaining communication clusters as 'slave clusters'.

The protocol engine labelled 'A' disregards potential stimuli from the other communication clusters and decides whether and how to start solely on the stimuli from its own communication cluster 'A'.

Similar to the first embodiment all communication clusters A-X must naturally be configured in a way to prevent collisions with frames or similar constructs sent by the protocol engine 12a labelled 'A'. For FlexRay this means to keep the key slot (within the startup frame is being transmitted) of the protocol engine 12a unoccupied in the 'slave clusters'.

This invention works best if no other conventional node in the 'slave clusters' B or X is allowed to initiate the startup procedure, but the whole communication relies on the presence of the transmissions of protocol engine 12a. This circumvents the problem of inconsistent startup attempts by nodes with the 'slave clusters' and the one of the protocol engine labelled 'A'.

By providing multiple such coupler clusters having a master protocol engine a single failure of the coupler clusters maybe avoided. Such multiple coupler clusters are solely responsible for the startup in all communication clusters, including the 'master cluster'. However, the 'startup master' of each such node must be connected to the same communication cluster. This prevents all potential startup inconsistencies. If additionally only frames or similar constructs sent by the 'startup masters' to all communication clusters via the described mechanism are used for clock synchronization, near-perfect synchronicity is enforced over all communication clusters.

For the FlexRay protocol, this would mean that no node but the described cluster coupler may send startup/synchronization frames. As a result, no communication cluster can continue communicating without being aligned to at least one such cluster coupler. The intercommunication of all cluster coupler on the 'master cluster' guarantees that all such 'startup masters' agree with one another on the timing, therefore all 'slave clusters' agree with the 'master cluster'. The only difference may stem from different topologies of the physical layer, which can be taken into account when defining a common assumed precision for all communication clusters.

Due to simplicity the terms "startup frame/data" and "synchronization frame/data" are used with the meaning. For solving the object of reducing the time for achieving synchronization between the clusters both terms may be used. The FlexRay protocol differentiates between these terms. The startup frame is used for startup, wherein the synchronization frame is used maintaining or restoring synchronization.

The invention claimed is:

1. For use in a time triggered network having a plurality of communication clusters each having a plurality of nodes, the communication clusters being compatible to each other in cycle length, slot length and frame length, a cluster coupler unit being connected to at least two communication clusters, the cluster coupler unit comprising:
as many protocol engines as communication clusters are connected to the cluster coupler unit, each protocol engine having at least one receiving input and one transmitting output, the transmitting output of each protocol engine being connected to a different and respective communication cluster for transmission of data thereto, synchronization logic that is connected to at least one of the receiving inputs or to at least one of the transmitting outputs, and that is configured and arranged to distribute startup/synchronization relevant information from incoming/outgoing signals to all connected clusters for synchronizing the connected communication clusters during startup by connecting, in response to a stimulus signal, the transmitting output of one of the protocol engines in the cluster coupler unit to the transmitting outputs of each other protocol engines in the cluster coupler unit to facilitate the transmission of the startup/synchronization relevant information to each respective communication cluster.

2. Cluster coupler unit according to claim 1, comprising a timing control unit for determining at which moment, or for which period, data containing relevant startup/synchronization information are exchanged between the communication clusters, and wherein each of the other protocol engines is configured and arranged to loopback the startup/synchronization relevant information, from its transmitting outputs, to its respective receiving input.

3. Cluster coupler unit according to claim 1, wherein all other nodes in the connected communication clusters cannot initiate a communication startup at all or have a generous delay configured to give the cluster coupler unit the opportunity to start up first.

4. Cluster coupler unit according to claim 1, wherein the cluster coupler unit is configured to receive a startup signal from an application host, wherein at least one of the protocol engines is configured to initiate a first transmission of output data which is distributed by the synchronization logic to all connected clusters.

5. Cluster coupler unit for connecting a plurality of communication clusters as claimed in claim 1, wherein a receiving path of each protocol engine is coupled to synchronization logic that is configured and arranged to form a common signal based on at least one received signal from at least one of the connected clusters, and to provide the common signal for starting the protocol engines of all communication clusters at the same moment.

6. Cluster coupler unit for connecting a plurality of communication clusters as claimed in claim 1, wherein a transmitting path of each protocol engine is coupled to synchronization logic that is configured and arranged to form a combined signal based on at least one signal to be transmitted from at least one of the protocol engines, and to provide the combined signal for transmitting startup signals to the communication clusters at the same moment for synchronizing the communication clusters.

7. Cluster coupler unit as claimed in claim 5, wherein a control circuit is configured and arranged to activate the synchronization for a predetermined time during startup or for a predetermined interval during operating the communication clusters.

8. Cluster coupler unit for connecting a plurality of communication clusters as claimed in claim 1, wherein a first protocol engine is configured and arranged to operate as a master protocol engine outputting a control signal to a control output and a startup signal to its transmitting path, wherein, based on the control signal from the master protocol engine, the startup signal is coupled to transmitting paths of the other protocol engines, wherein the transmitting paths of the other protocol engines include a synchronization circuit configured and arranged for outputting the startup signal from the master protocol engine to be transmitted to the connected other communication clusters and thereby also synchronizing and starting the other protocol engines.

9. Cluster coupler unit for connecting a plurality of communication clusters as claimed in claim 8, wherein the cluster coupler unit includes a control circuit which is protocol dependent and is controlling the distribution of startup and/or clock synchronization information across the connected communication clusters.

10. A method for synchronizing a plurality of clusters in a time-triggered network, the network includes a cluster coupler connected to a plurality of clusters, wherein each cluster has assigned a protocol engine within the cluster coupler for converting the protocol of the connected cluster; the method comprising:
  providing a stimulus to the cluster coupler;
  transmitting information indicating a startup synchronization to a cluster by one of the protocol engines;
  distributing the information indicating a startup synchronization in a synchronization logic included in the cluster coupler by connecting, in response to the stimulus, a transmitting output of the one of the protocol engines, having the startup synchronization transmitted thereto, to a transmitting output of all remaining protocol engines within the cluster coupler;
  starting the clusters connected to the cluster coupler, in response to the startup synchronization transmitting to the plurality of clusters, simultaneously in response to the information indicating a startup synchronization.

11. A network operating on a time-triggered protocol, the network comprising:
  a plurality of communication clusters each having a plurality of nodes, the communication clusters configured to be compatible to each other in cycle length, slot length and frame length,
  a cluster coupler unit being connected to at least two communication clusters, the cluster coupler unit including as many protocol engines as communication clusters are connected thereto, each protocol engine having at least one receiving input and one transmitting output, the transmitting output of each protocol engine being connected to a different and respective one of the communication clusters for transmission of data thereto,
  a synchronization logic that is connected to at least one of the receiving inputs or at least one of the transmitting outputs of the protocol engines, and that is configured and arranged to distribute startup/synchronization relevant information from incoming/outgoing signals to all connected clusters for synchronizing the connected communication clusters during startup by connecting, in response to a stimulus signal, the transmitting output of one of the protocol engines in the cluster coupler unit to the transmitting outputs of each other protocol engines in the cluster coupler unit to facilitate the transmission of the startup/synchronization relevant information to each respective communication cluster.

12. The cluster coupler unit of claim 1, wherein the synchronization logic includes circuitry configured and arranged to transmit, when enabled during synchronization, synchronization data from a particular one of the protocol engines to each communication cluster of the plurality of communication clusters and to transmit, when disabled, data from each of the protocol engines to a corresponding and respective communication cluster of the plurality of communication clusters.

13. The cluster coupler unit of claim 12, wherein the synchronization logic includes one or more switches that, when enabled during synchronization, connect a transmission output of the protocol engines to synchronization logic circuitry configured and arranged to combine data received from multiple protocol engines and to provide the combined data to a corresponding communication cluster.

14. The cluster coupler unit of claim 12, wherein each protocol engine is configured and arranged to receive synchronization data from one or more other protocol engines from loopback to a corresponding receiving input.

15. The cluster coupler of claim 1, the synchronization logic includes circuitry for simultaneously broadcasting synchronization data from one protocol engine to multiple communication clusters and wherein the protocol engines corresponding to the multiple communication clusters are configured and arranged to receive the synchronization data from a loop back to a corresponding receiving input.

16. The cluster coupler unit according to claim 1, further including
  control circuitry configured and arranged to generate a control signal in response to the stimulus signal; and
  switching circuitry configured and arranged to pass the startup/synchronization relevant information to the transmitting outputs of the other protocol engines, in response to the control signal.

17. The cluster coupler unit according to claim 16, further including AND/OR logic circuitry configured and arranged to provide the startup/synchronization relevant information from the transmitting output of the one of the protocol engines to the transmitting outputs of the other protocol engines.

* * * * *